United States Patent
Davis, Jr. et al.

(10) Patent No.: US 6,756,004 B2
(45) Date of Patent: Jun. 29, 2004

(54) METHOD FOR MANUFACTURING COCKPIT-TYPE INSTRUMENT PANELS

(75) Inventors: Joseph J. Davis, Jr., Ortonville, MI (US); Michael J. Hier, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 112 days.

(21) Appl. No.: 10/131,015

(22) Filed: Apr. 24, 2002

(65) Prior Publication Data

US 2003/0201571 A1 Oct. 30, 2003

(51) Int. Cl.[7] .................. B29C 45/14; B29C 70/76; B29C 70/80
(52) U.S. Cl. .................. 264/255; 264/267; 264/328.7
(58) Field of Search .................. 264/250, 254, 264/255, 259, 267, 268, 275, 328.7, 328.8, 251, 273, 274; 29/897, 897.2, 897.32; 296/191

(56) References Cited

U.S. PATENT DOCUMENTS

| | | | | |
|---|---|---|---|---|
| 4,444,711 A | * | 4/1984 | Schad | 264/243 |
| 4,885,121 A | * | 12/1989 | Patel | 264/255 |
| 5,005,898 A | | 4/1991 | Benedetto et al. | |
| 5,008,060 A | * | 4/1991 | Kanai et al. | 264/255 |
| 5,073,318 A | * | 12/1991 | Rohrlach et al. | 264/46.5 |
| 5,557,078 A | | 9/1996 | Holwerda | |
| 5,618,485 A | * | 4/1997 | Gajewski | 264/255 |
| 5,676,216 A | | 10/1997 | Palma et al. | |
| 5,824,974 A | | 10/1998 | Campbell | |
| 5,924,764 A | | 7/1999 | Eipper et al. | |
| 5,947,511 A | * | 9/1999 | Usui et al. | 280/728.3 |
| 5,975,609 A | | 11/1999 | Campbell | |
| 6,030,567 A | * | 2/2000 | Takeuchi | 264/255 |
| 6,070,928 A | | 6/2000 | Campbell | |
| 6,098,272 A | | 8/2000 | Paulus et al. | |
| 6,108,193 A | | 8/2000 | Haberstroh | |
| 6,123,889 A | * | 9/2000 | Katagiri et al. | 264/255 |
| 6,146,565 A | * | 11/2000 | Keller | 264/46.5 |
| 6,152,489 A | | 11/2000 | Hedderly et al. | |
| 6,210,266 B1 | | 4/2001 | Barton | |
| 6,210,614 B1 | * | 4/2001 | Gardner et al. | 264/46.5 |
| 6,231,116 B1 | | 5/2001 | Naert et al. | |
| 6,234,569 B1 | | 5/2001 | Derleth et al. | |
| 6,237,956 B1 | | 5/2001 | Haba et al. | |
| 6,391,242 B2 | * | 5/2002 | Preisler et al. | 264/241 |
| 6,413,460 B1 | * | 7/2002 | Wisniewski et al. | 264/254 |
| 6,460,880 B1 | * | 10/2002 | Gallagher et al. | 280/732 |
| 2001/0002632 A1 | | 6/2001 | Novitschitsch | |

* cited by examiner

Primary Examiner—Angela Ortiz
(74) Attorney, Agent, or Firm—Bill C. Panagos

(57) ABSTRACT

A method for manufacturing a modular plate for a cockpit-type instruments panel includes molding a modular plate having an outer peripheral rim and a plurality of apertures in a first shot of an two-shot injection molding process, and then overmolding a plurality of seals about the outer rim and at least one aperture during a second shot of the two-shot process.

18 Claims, 3 Drawing Sheets

Fig. 5
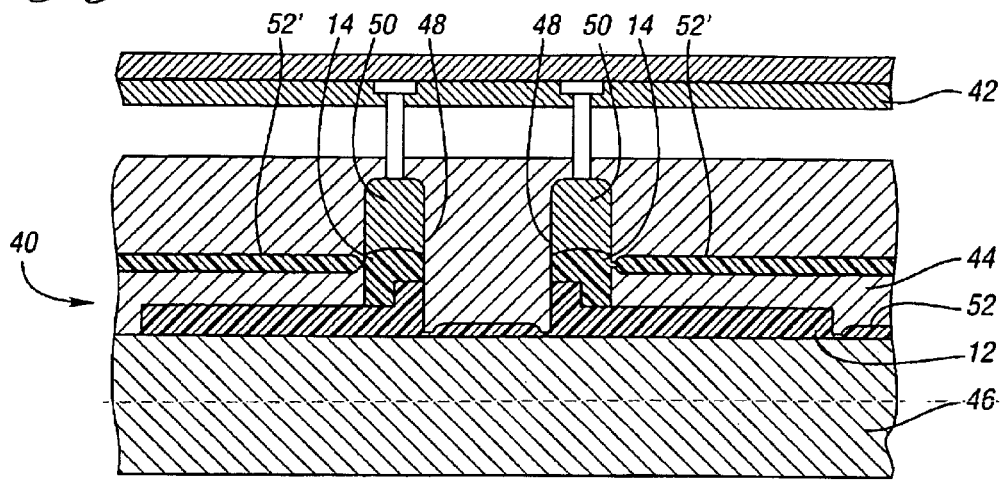
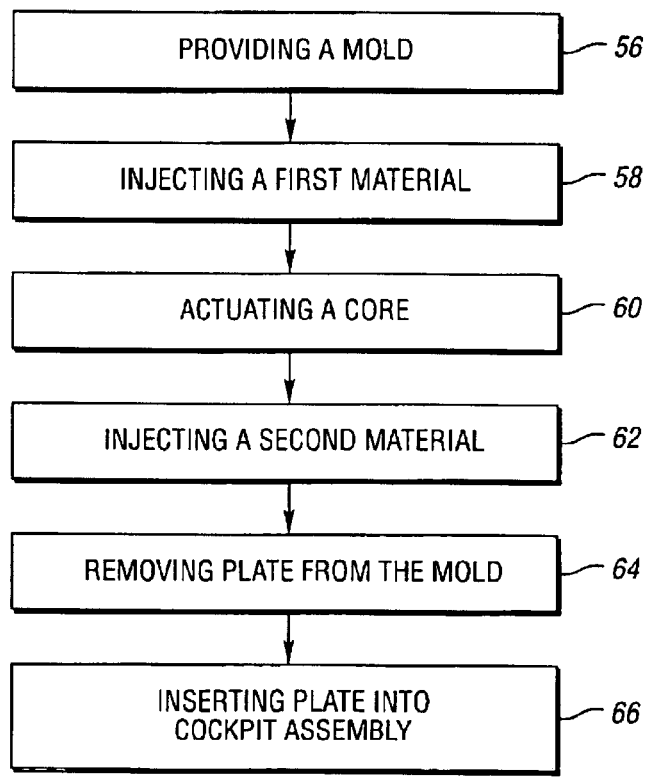
Fig. 6

METHOD FOR MANUFACTURING COCKPIT-TYPE INSTRUMENT PANELS

BACKGROUND OF THE INVENTION

1. Field of the Invention

The invention relates to methods for manufacturing cockpit-type instruments panels.

2. Background Art

As is known in the art, automobile, and airplane manufacturers use an assembly line process to construct their products. One development in the assembly of vehicles is the compartmentalization of different portions of the vehicle or plane into prefabricated assemblies. Cockpit-type instrument panels are typically made as prefabricated assemblies.

A cockpit-type instrument panel is the prefabrication of the portion of a vehicle between the operator and the engine and includes the structures and electronics for the firewall, steering column, foot pedals, instrument panel, cross car beam, air bag assembly, stereo, HVAC, tubing, and the like in a singular cockpit assembly. The cockpit is assembled and delivered as a completed product to the assembly line for installation in the vehicle.

Prefabrication of the cockpit is a complex assembly process. Accordingly, it is desirable to improve the methods of manufacturing the components that comprise the cockpit, such as the firewall, steering column, foot pedals, instrument panel, cross car beam, air bag assembly, stereo, HVAC, tubing, and the like. One area addressed by the invention is the manufacturing of a modular cockpit plate section that interfaces with, or otherwise defines a portion of, the firewall. By incorporating all the components into a single cockpit, the automotive assembly plan does not have to concern itself with all the individual components.

The firewall is typically a solid structure that extends the width of the vehicle to separate the engine compartment from the passenger compartment and includes a number of apertures/openings for components on the passenger side to communicate with components on the engine side. One such aperture is located directly in front of the driver and around the steering column and foot pedals. A modular plate is secured to the firewall to cover this aperture and includes its own apertures/openings through which the steering column and foot pedals extend for communicating with the engine side. Accordingly, there exists a need for a method of manufacturing a modular plate section of a cockpit-type instrument panel that interfaces with, or otherwise defines, a portion of the firewall.

The purpose of a firewall is to prevent the noise, dirt, heat, fumes, and other elements of the engine compartment from entering into the passenger compartment. The outer periphery of the modular plate and the apertures within the modular plate for the steering column and foot pedals create seams and gaps through which the elements of the engine compartment can enter into the passenger compartment.

Accordingly, there exists a need for a method of manufacturing a modular plate section of a cockpit-type instrument panel with seals formed about the outer periphery and apertures of the modular plate.

SUMMARY OF THE INVENTION

It is an object of this invention to provide a method for manufacturing a cockpit-type instrument panel including a modular plate.

It is another object of this invention to provide a method of manufacturing a modular plate section of a cockpit-type instrument panel with seals formed about the outer periphery and apertures of the modular plates.

In one aspect of the invention, the method includes providing a two-shot injection molding mold. The mold is injected with two shots of molding materials. The first shot injects material into the mold for forming a modular plate that has an outer peripheral rim and at least one aperture. The second shot injects material into the mold for simultaneously forming one seal about the outer peripheral rim and a second separate seal about the at least one aperture.

In accordance with other aspects of the invention, the method is for manufacturing a modular plate into a completed product that is adaptable to be secured to a firewall of a prefabricated cockpit assembly. The completed modular plate has seals for sealing gaps in and around the modular plate so that the modular plate and the cockpit components contacting and extending through the modular plate are substantially sealed for preventing the noise, dirt, heat, fumes, and other elements of an engine compartment from entering into a passenger compartment. Accordingly, the method comprises injecting a first type of material during a first shot of two-shot injection molding process into a two-shot injection molding mold to form the modular plate with an outer rim and a plurality of apertures. The method further comprises injecting a second type of material during a second shot of the two-shot injection molding process after a cam of the injection molding mold has been actuated to create relief cavities into which the second material flows to simultaneously form separate seals about the outer rim and at least one of the apertures.

In yet other aspects of the invention, the cockpit can be used in automobiles, planes, and other devices. The seals can be rubber, plastic, or other material suitable for injection molding and can be formed into both uniform and non-uniform cross-sectional profiles and configurations. For example, the seal can be beaded, ribbed, elliptical, or a mixture of these and other geometries. The modular plate is a completed product that can be inserted into an assembly process for manufacturing a prefabricated cockpit assembly.

BRIEF DESCRIPTION OF THE DRAWINGS

FIG. 5 is a cross-sectional view of the two-shot injection molding mold after the second shot of material used to form the seals has been injected into the mold in accordance with the invention; and FIG. 6 illustrates a flow chart for a method of manufacturing a cockpit-type instrument panels in accordance with the present invention.

DETAILED DESCRIPTION OF THE PREFERRED EMBODIMENT(S)

Figure 1:
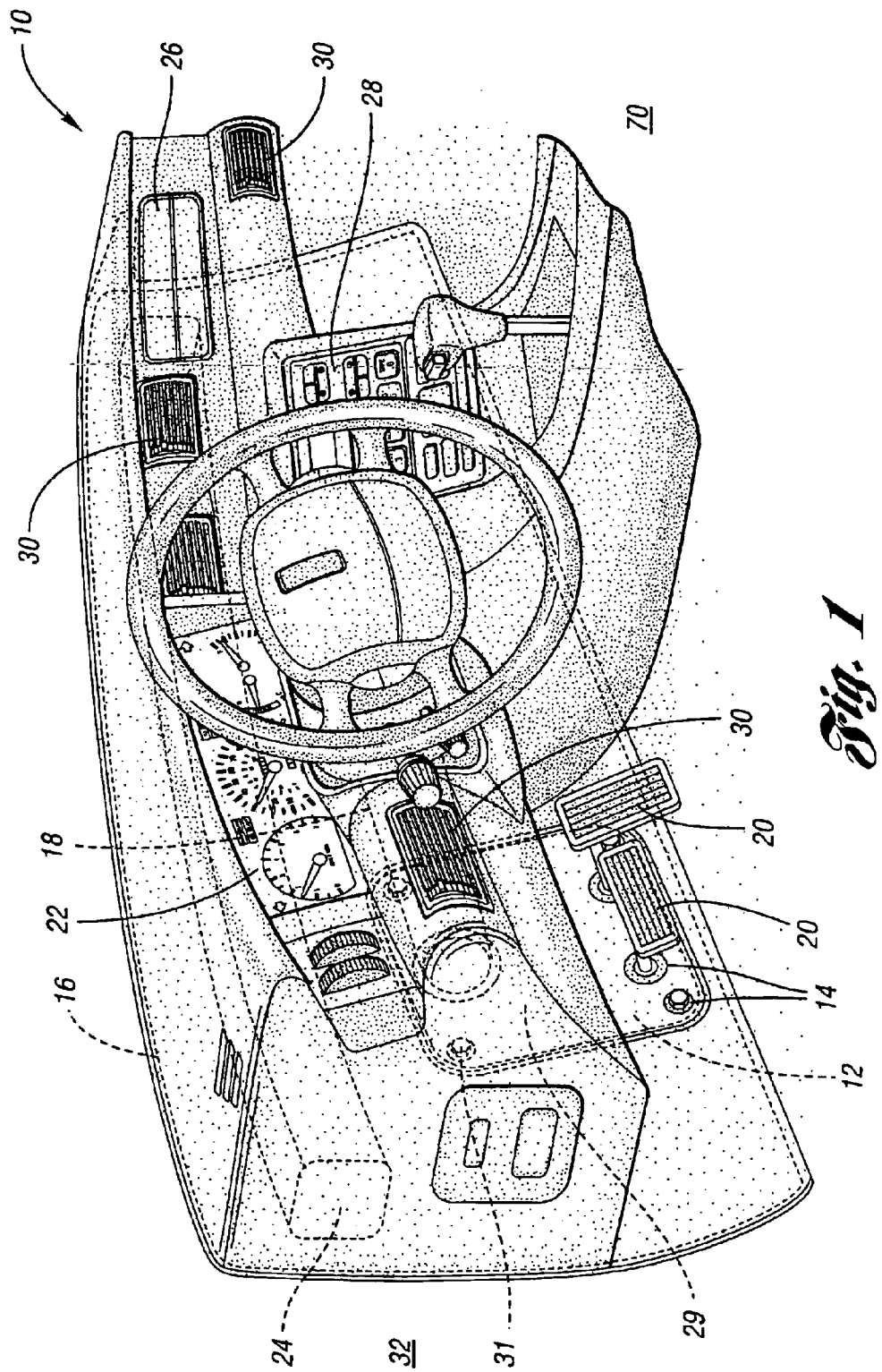
FIG. 1 illustrates a perspective view of one variation of a cockpit-type instrument panel for a motor vehicle in accordance with the invention.

FIG. 1 illustrates a perspective view of one variation of the cockpit 10 for a motor vehicle in accordance with the invention. The cockpit 10 is just one of the many styles of cockpits that are incorporated by the invention and that may be found in a typical automobile. The cockpit 10 can be constructed for use in any other type of device, like an airplane or boat. The principal object of the cockpit 10 is to provide the manufacturers of car, planes, and boats with the ability to order completed cockpits for ready installation. For example, an automobile is typically manufactured along an assembly line. Accordingly, the automobile manufacturer requests a supplier to design a particular type of cockpit. The supplier designs the cockpit and assembles the necessary components into a prefabricated unit that can be shipped to the automobile manufacturer for ready installation. This way, the automotive assembler does not have to concern itself with all the individual components that are in a cockpit.

As such, the cockpit 10 can include any number of components one may require. For example, and to name only a few of the components which may be included, the cockpit 10 of the invention is shown for exemplary purposes to include modular plate 12, seals 14, firewall 16, steering column 18, foot pedals 20, instrument panel 22, cross car beam 24, air bag assembly 26, stereo 28, and HVAC tubing 30.

The cockpit 10 can include any number of other components, such as television screens, VCRs, computers, cell phone adaptors, and the like. Moreover, the cockpit 10 can include the actuation devices and electronics which interconnect with the cockpit components. For example, the cockpit 10 can include a brake boost actuation assembly (not shown) and steering column actuation assembly (not shown) to which the brake pedal 20 and the steering column 18 are connected. The general purpose of the cockpit 10 is to provide assembly lines with a prefabricated cockpit that includes any desired cockpit component, and the actuating devices for the components, so that the prefabricated unit can be inserted into the manufacturing assembly lines of vehicles, airplanes, and others. Accordingly, any component actuated by a cockpit component can be included in the prefabricated cockpit for delivery to the relevant assembly line process.

The invention relates to the manufacturing of the cockpits in general, and particularly, to the manufacturing of a modular plate 12 section of the cockpit 10. With reference to the automotive application, the modular plate 12 is adapted to be secured to the firewall 16. The firewall 16 extends along the rear of the cockpit 10 across a substantial portion of the width of the vehicle and next to the engine compartment side 32. Firewall 16 is manufactured with any number of different materials, such as steel or plastic, and is used to prevent the noise, dirt, heat, fumes, and other elements developed in the engine compartment 32 from entering into the passenger compartment side 70. Accordingly, the firewall 16 isolates the engine compartment side 32 from the passenger compartment side 70.

The firewall 16 includes a number of apertures that provide openings to the engine side 32 so that the components located on the passenger side compartment 70 can communicate with respective components on the engine side 32. For example, the steering column 18, foot pedals 20, and HVAC tubing 30 are all types of components which need to communicate between the passenger compartment side 70 and the engine side 32. Consequently, an aperture is provided through the firewall 16 for each of these components to communicate with the engine side 32. A larger aperture 29 is typically located in front of the driver and around the steering column 18 and the foot pedals 20. The aperture 29 is covered with the modular plate 12, whereby the modular plate 12 supplies apertures/opening for the steering column 18 and the foot pedals 20. The modular plate 12 is secured to the firewall 16, within the aperture 29, by fasteners 31.

Consequently, the modular plate 12 includes fastener apertures 33, steering column aperture 35, and foot pedal apertures 37 for the fasteners 31, the steering column 18, and the foot pedals 20 respectively. In a completed cockpit assembly, the corresponding components, such as the steering column 18, are located within their respective aperture, such as the steering column aperture 35, so that the component can communicate with the engine side 32. Necessarily, seams and gaps are formed between the aperture and the component which extends through the aperture, as well as between the modular plate outer peripheral rim 38 and the firewall 16. As such, these seams and gaps can permit the noise, dirt, heat, fumes, and other elements of the engine compartment to enter into passenger compartment side 70. Accordingly, the method of the invention includes simultaneously forming seals 14 about the fastener apertures 33, the steering column aperture 34, the pedal apertures 36, and the outer peripheral rim 38 to seal the passenger compartment side 70.

Figure 3:
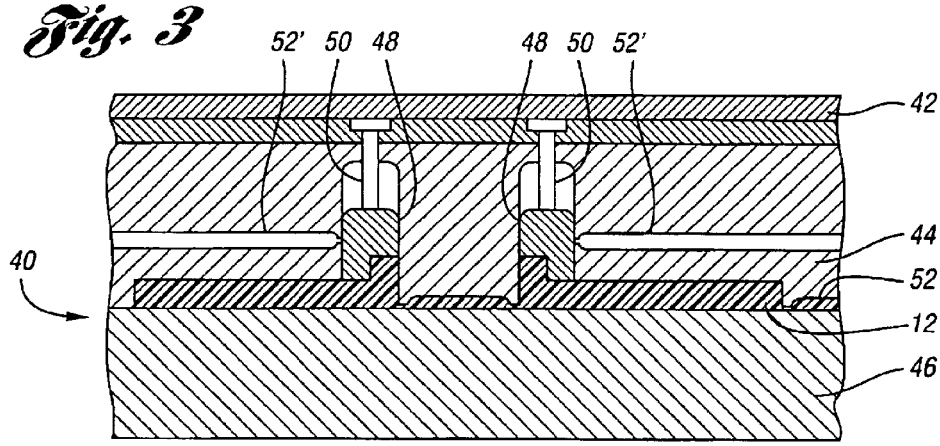
FIG. 3 is a cross-sectional view of a two-shot injection molding mold after the first shot of material used to form a modular plate has been injected into the mold in accordance with the invention.
Figure 4:
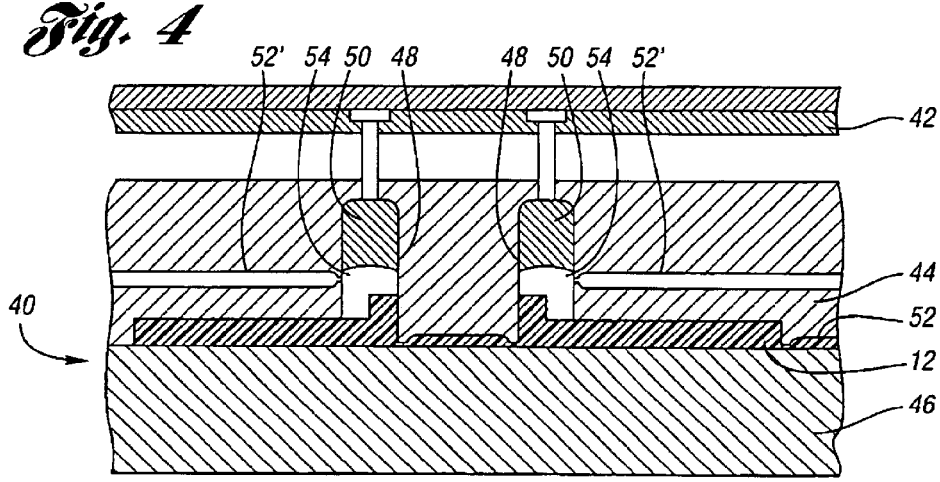
FIG. 4 is a cross-sectional view of the two-shot injection molding mold after the first shot and before the second shot has been injected into the mold in accordance with the invention.

The method for manufacturing a cockpit-type instrument panel including a modular plate in accordance with the invention includes forming both the modular plate 12 and seals 14 in a singular two-shot injection molding mold 40. The mold 40 is illustrated in FIGS. 3–5. FIG. 3 is a cross-sectional view illustrating the two-shot injection molding mold 40 after a first shot of material used to form the modular plate 12 has been injected into the mold 40. The mold 40 includes a cam 42, a core 44, a cavity 46, inserts 48, connectors 50, and runners 52. As shown in FIG. 3, the cam 42 is in a closed position. As such, the first injected material flows through the runner 52 to form the modular plate 12. After the first material has been injected, and prior to the injection of a second material, the cam 42 is actuated into a non-closed position, as shown in FIG. 4. Consequently, inserts 48, which are connected to the cam 42 by connectors 50, slide into a different position and form a relief cavity 54. The relief cavity 54 thereby forms the boundaries into which the second injected material can flow to over-mold the seal 14 around the steering column aperture 35. As shown in FIG. 5, the second injection material used to form the seal 14 flows through the runner 52' to form the seal 14 around steering column aperture 35.

Likewise, multiple portions of the mold 40 include similar runners and inserts to define and form the other seals 14 around foot pedal apertures 37, fastener apertures 33, and the outer peripheral rim 38. Advantageously, the seals are all formed simultaneously during the second shot, thus decreasing the number of assembly steps required to form the modular plate 12 with the seals 14. Accordingly, when the modular plate 12 is removed from the mold 40, the modular plate 12 includes the seals 14 and is a completed product ready for installation into a cockpit assembly. Moreover, the mold 40 can include any shape and size desired for both the modular plate 12 and seals 14 to accommodate the design of cockpit 10. Especially advantageous is the flexibility of the mold 10 to be re-designed or re-used for multiple cockpits assemblies that may have differently configured modular plates and seals. Still further, the amounts of material injected can be easily controlled to make up for tolerancing difficulties and to limit material waste.

A flow chart for the method of forming the modular plate 12 and seals 14 is shown in FIG. 6. In summary, a two-shot injection molding process injects a first shot of one type of material into an injection molding mold 40 to form the modular plate 12 and injects a second shot of different material into the mold 40 to form the seals 14. For example, at step 56, a two shot injection molding mold is provided. Next, at step 58, a first shot of the modular plate material is injected into the mold 40 and carried by the runners 52 to form the modular plate 12. Then, at step 60, the cam 42 is actuated to created the relief cavity 54 for the seals 14. Next, at step 62, a second different type of material is injected into the mold 40 and carried by the runners 52 to simultaneously form at least one seal 14. Only after both shots have been injected is the modular plate 12 removed from the mold 40, at step 64. It is then inserted into a cockpit assembly process at step 66 where it is adapted to be secured to the firewall 16 by fasteners 31 without needing any additional sealing steps.

Figure 2:
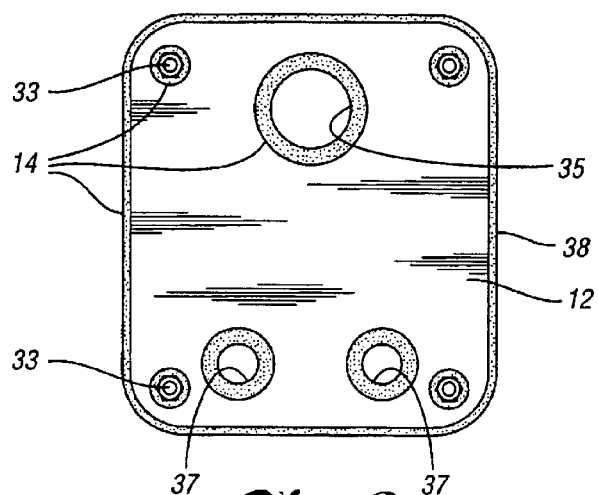
FIG. 2 illustrates a front view of a modular plate shown in FIG. 1.

As shown in FIG. 2, the modular plate 12 is formed during a two-shot injection molding process to include the seal 14 around the fastener aperture 33, the steering column aperture 34, the foot pedal aperture 36, and the modular plate rim 38. The sealant material can be virtually any type of rubber, plastic, or other material as long as it is suitable for the two-shot injection molding process. Particularly beneficial is the use of these various materials. For example, a relatively more rigid type of material can be used to form the seal about the outer peripheral rim so that the cross car stability of the cockpit can be improved. Moreover, the relatively more rigid seal about the outer periphery can be formed simultaneously with the molding of a relatively less rigid seal about the apertures, i.e, to limit the violence caused by extending the device through the apertures. Still further, the seals 14 can be formed into any number of different profiles and configurations, such as beaded or ribbed, which configurations are understood by one skilled in the art.

The use of a two-shot process in accordance with the invention advantageously allows for the formation of multiple seal profiles and configurations with minimal changes in the complexity and costs of the process, i.e., by simply changing a mold cavity, or even more simply by only changing the configuration of an insert. Moreover, the quality of the molded seal 14 is improved because possible gaps due to tolerance accumulation can be anticipated and accommodated through proper selection of seal profile and configuration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for manufacturing a cockpit-type instrument panel having a modular plate, the modular plate having a plurality of apertures therethrough and an outer rim, the method comprising;

providing a two-shot injection molding mold;

injection molding a first material to form the cockpit modular plate in a first shot in the mold; and injection molding a second material about the cockpit modular plate to simultaneously form separate seals about at least one aperture and about the cockpit modular outer rim of the plate in a second shot in the mold.

2. The method of claim 1, further comprising actuating a portion of the injection molding mold after the first shot to create relief cavities for the seals.

3. The method of claim 1, wherein injection molding the cockpit modular plate in the first shot comprises providing a number of apertures within the cockpit modular plate for each of a steering column, foot pedals, and fasteners.

4. The method of claim 3, wherein injection molding the seal in the second shot includes injection molding a separate seal for each of a steering column aperture, foot pedal apertures, and fastener apertures.

5. The method of claim 3, wherein the seals have a beaded configuration.

6. The method of claim 3, wherein the seals have a ribbed configuration.

7. The method of claim 3, wherein the seal is a rubber material suitable for injection molding.

8. The method of claim 3, wherein the seal is a plastic material suitable for injection molding.

9. The method of claim 1, further comprising inserting the cockpit modular plate having seals into an assembly process of the cockpit-type instrument panel.

10. The method of claim 1, wherein the cockpit-type instrument panel is for a motor vehicle.

11. The method of claim 1, wherein the cockpit-type instrument panels if for an aeronautical vehicle.

12. A method of manufacturing a modular plate section of a prefabricated cockpit assembly that is adapted to be secured to a firewall, the method comprising:

injecting a first type of material during a first shot of a two-shot injection molding process into a two-shot injection molding mold to form the modular plate with an outer rim and a plurality of apertures; and injecting a second type of material during a second shot of the two-shot injection molding process after a cam of the injection molding mold has been actuated to create relief cavities into which the second type of material flows to simultaneously form separate seals about the outer rim and at least one of the apertures.

13. The method of claim 12, wherein injection molding the modular plate in the first shot comprises providing a number of apertures within the modular plate for each of a steering column, foot pedals, and fasteners.

14. The method of claim 13, wherein injection molding the seal in the second shot includes injection molding a separate seal to each of a steering column aperture, foot pedal apertures, and fastener apertures.

15. The method of claim 14, wherein the seals have a beaded configuration.

16. The method of claim 14, wherein the seals have a ribbed configuration.

17. The method of claim 12, wherein the cockpit assembly is for a motor vehicle.

18. The method of claim 12, wherein the cockpit assembly is for an aeronautical vehicle.

* * * * *